Oct. 13, 1925.

F. H. NULLMEYER 1,557,319

REEL

Filed Aug. 9, 1923

INVENTOR
Frank H. Nullmeyer,

Patented Oct. 13, 1925.

1,557,319

UNITED STATES PATENT OFFICE.

FRANK H. NULLMEYER, OF STRUTHERS, OHIO.

REEL.

Application filed August 9, 1923. Serial No. 656,574.

*To all whom it may concern:*

Be it known that I, FRANK H. NULLMEYER, a citizen of the United States, residing at Struthers, county of Mahoning, State of Ohio, have invented a new and useful Invention in Reels, of which the following is a full, clear, and exact description.

This invention relates to an improvement in reels, and more particularly to reels for holding wire for fencing, etc.

One of the objects of my invention is to provide a built up reel formed of a plurality of members, which can readily be made of wire rods and which members can readily and quickly be assembled without the use of tools, as well as a reel which is rigid when assembled and which will not collapse when the wire or other material is wound thereon.

The precise nature of my invention will be best understood by reference to the accompanying drawings, which will now be described, it being premised, however, that various changes may be made without de parting from the spirit or scope of my invention as defined in the appended claims.

Figure 1:
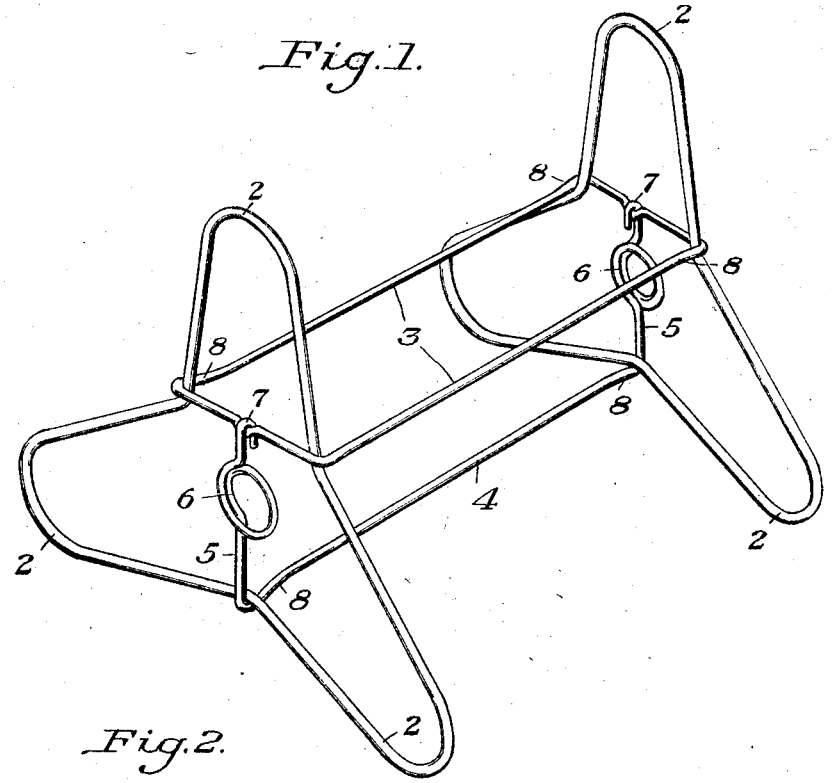

Fig. 1 is a perspective view of one form of reel made in accordance with my invention.

Figure 2:
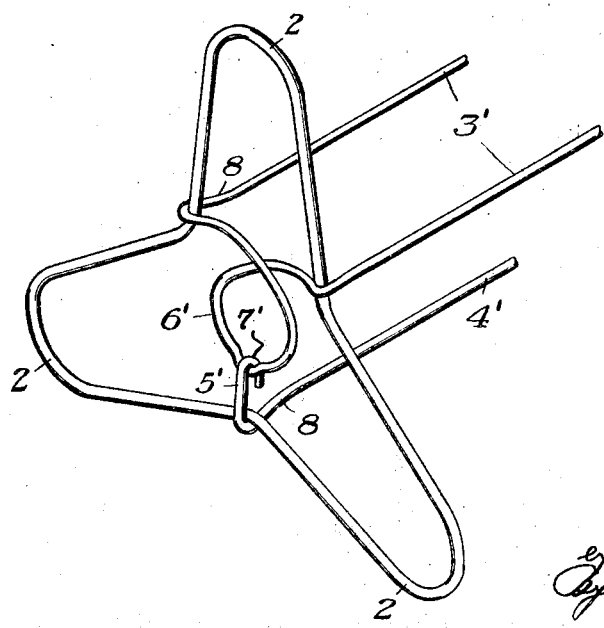

Fig. 2 is a perspective view of a portion of another reel made in accordance with my invention.

The reel shown as Fig. 1 of the drawings comprises two end members, each having three legs 2, which are connected to each other by body forming members 3 and 4. The body forming member 3 is of rectangular form and straddles one leg of each of the end members. The other member 4 has a longitudinal portion which extends from end member to end member and radially extending portions 5, each having a ring 6 and a hook 7. The hooks 7 engage the transverse portions of the member 3 and retain the members 3 and 4 from spreading relative to each other.

In assembling the device, the members 3 and 4 are positioned relative to each other, the head or end members are then inserted between members 3 and 4 in a substantially horizontal position and are then moved to an upright position and pressed toward the end. The end members and the body member 3 are preferably made of rings formed of wire and in which the ends are welded to each other to form rings of predetermined lengths. The rings are then pressed to shape and when the heads or end members are assembled as shown in Figure 1, the body members 3 and 4 are placed under tension.

Each of the longitudinally extending portions of said body forming members 3 and 4 may be provided with an offset portion 8 near each end thereof forming seats for the head members 2.

In the form of the invention shown in Figure 1, the rings 6 which form the spindle bearings for the reel are formed on the body forming member 4 by forming looped portions on the radially extending portions 5 of said member 4. In the modified form of the invention shown in Figure 2 the body forming member 3′ has looped portions 6′ constituting the spindle bearings and the hooks 7′ on the arms 5′ of the body forming member 4′ engage said looped portions.

It will be apparent that in both forms of the invention the radially extending arms 2 form star shaped head members. This shape of the head members renders the reel structure more stable and less liable to collapse when the parts are assembled in operative relation as shown in the drawings.

The advantages of my invention result from the provision of a reel formed of members which can readily be stacked or bundled in a small space and which can readily be assembled without the use of tools. And further advantages result from the provision of a knockdown reel in which the body members interlock with each other and with the end members in such a manner that the end members are positively held against transverse movement relative to the body members, without providing indentations in the end members for the reception of the body members at the points of intersection.

When the reel is assembled the body parts are restrained against spreading by their interlocking connections and are restrained against collapse by the end members, and as the parts are so formed that the end members tend to spread the body members, the various elements will be under tension, thus forming a reel of substantially rigid construction.

It will be noted from the drawings that the head or end members which are subjected to lateral pressure or bending stresses by the wire when wound on the reel, are made of heavier gage wire than the body members, which are merely subjected to tension stresses.

I claim:

1. A reel having two head members, each head member having three radial arms, and two separable body members formed of wire, one of said body members being endless and of retangular form and straddling one arm of each head, and the other of said members being U-form and engaging each head between the other two arms thereof, said U-member having hooks at its ends engaging the endless body member and one of said body members having looped portions forming spindle bearings for the reel adjacent the ends of the latter, substantially as described.

2. A reel having two star shaped head members, each head member having three radial arms, and two separable body members formed of wire, one of said body members being endless and of rectangular form and straddling one arm of each head, and the other of said members being of U-form and engaging each head between the other two arms thereof, said U-member having hooks at its ends engaging the endless body member and one of said body members having looped portions forming spindle bearings for the reel adjacent the ends of the latter, substantially as described.

3. A reel having two head members, each head member having three radial arms, and two separable body members formed of wire, one of said body members being endless and of rectangular form and straddling one arm of each head, and the other of said members being of U-form and engaging each head between the other two arms thereof, said endless body member having looped portions forming spindle bearings for the reel adjacent the ends of the latter, and said U-member having hooks at its ends engaging said looped portions, substantially as described.

In testimony whereof I have hereunto set my hand.

FRANK H. NULLMEYER.